US011921406B2

(12) United States Patent
Akaiwa et al.

(10) Patent No.: US 11,921,406 B2
(45) Date of Patent: Mar. 5, 2024

(54) PROJECTION DISPLAY APPARATUS

(71) Applicant: Panasonic Intellectual Property Management Co., Ltd., Osaka (JP)

(72) Inventors: Natsumi Akaiwa, Osaka (JP); Shinya Sannohe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/743,001

(22) Filed: May 12, 2022

(65) Prior Publication Data
US 2022/0365408 A1    Nov. 17, 2022

(30) Foreign Application Priority Data

May 17, 2021 (JP) .................................. 2021-083206

(51) Int. Cl.
*G03B 21/14*    (2006.01)
*G02B 5/20*    (2006.01)
*G02B 13/16*    (2006.01)

(52) U.S. Cl.
CPC ............... *G03B 21/14* (2013.01); *G02B 5/20* (2013.01); *G02B 13/16* (2013.01)

(58) Field of Classification Search
CPC .......... G03B 21/14; G02B 5/20; G02B 13/16; G02B 1/11; G02B 9/64; G02B 27/18; G02B 5/22
See application file for complete search history.

(56) References Cited

U.S. PATENT DOCUMENTS

| 2004/0257539 | A1 | 12/2004 | Peterson et al. | |
| 2007/0002450 | A1* | 1/2007 | Watanabe | G02B 27/0025 359/601 |
| 2015/0309225 | A1* | 10/2015 | Moore | A61B 1/00186 359/885 |
| 2016/0277718 | A1* | 9/2016 | Teramoto | G02B 1/118 |
| 2019/0235227 | A1* | 8/2019 | Yamamoto | G02F 1/19 |
| 2021/0112225 | A1* | 4/2021 | Liao | H04N 9/317 |

FOREIGN PATENT DOCUMENTS

| JP | 5-34672 | 2/1993 |
| JP | 2005-77814 | 3/2005 |
| JP | 2016-173484 | 9/2016 |
| WO | 2005/067621 | 7/2005 |

\* cited by examiner

*Primary Examiner* — Magda Cruz
(74) *Attorney, Agent, or Firm* — Wenderoth, Lind & Ponack, L.L.P.

(57) ABSTRACT

A projection lens unit of the present disclosure is a projection lens unit that enlarges and projects image light output from an image forming unit onto a projection target, the image light including first light and second light having a longer wavelength band than the first light. The projection lens unit includes a plurality of lenses coated with a first antireflection coating, and a wavelength selection filter having a first region in a center of the wavelength selection filter through which an optical axis passes and a second region around the first region. In the wavelength selection filter, a transmittance of the first light in the second region is lower than a transmittance of the first light in the first region.

29 Claims, 12 Drawing Sheets

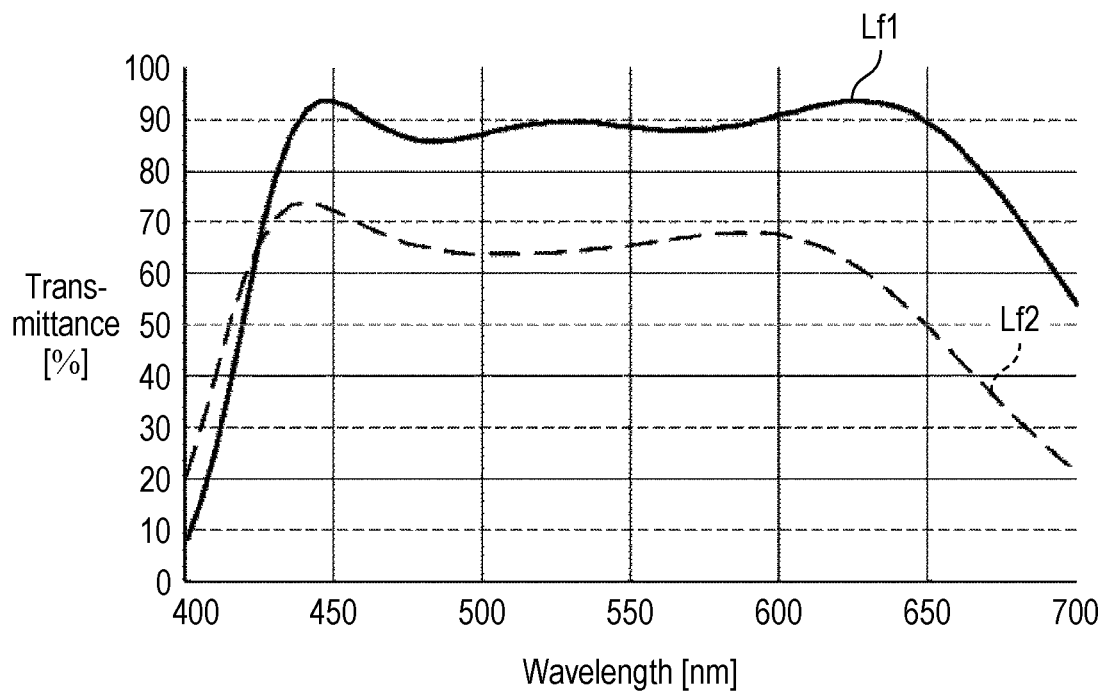
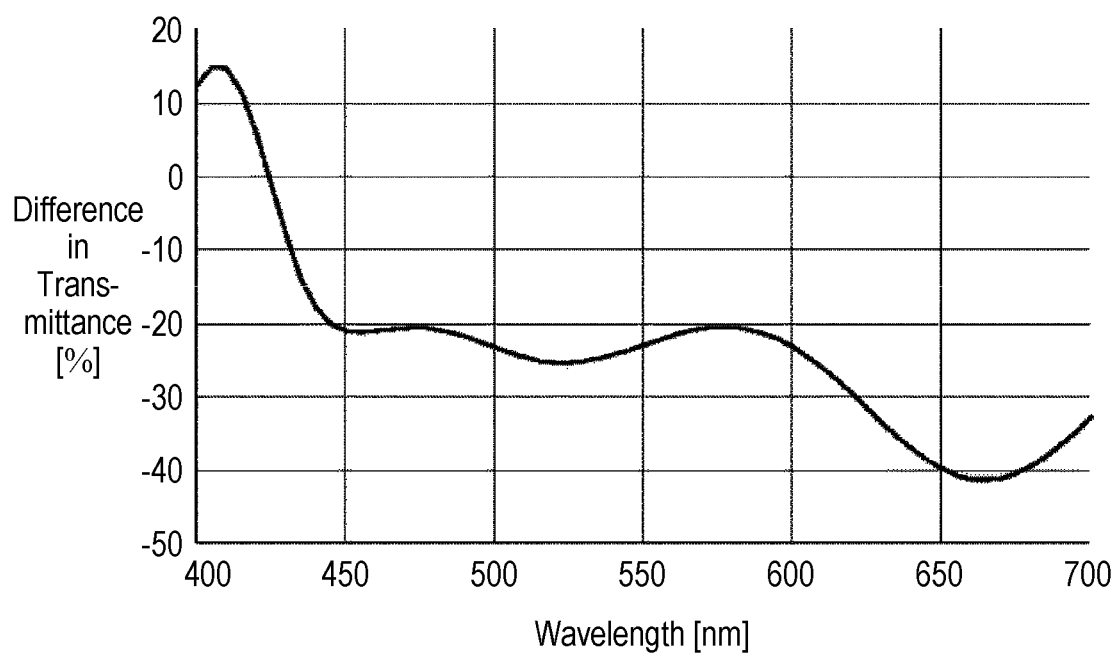

PROJECTION DISPLAY APPARATUS

BACKGROUND

1. Technical Field

The present disclosure relates to a projection lens unit and a projection display apparatus.

2. Description of the Related Art

Conventionally, there is a projection display apparatus including a projection lens unit that enlarges and projects image light emitted from an image forming unit, and enlarges and projects the image light onto a projection target such as a screen.

For example, a projection display apparatus of patent literature (PTL) 1 employs a wide-angle lens group as a projection lens unit. It is described that a video provided from a digital micromirror device (DMD) is projected on a screen by a relay lens group and the wide-angle lens group. PTL 1 is WO 2005/067621 A.

SUMMARY

However, when the projection lens unit is used, color uniformity may be impaired from a center to a periphery of a projected image on the projection target. In particular, when a wide-angle projection lens unit is used, this tendency increases.

Therefore, an object of the present disclosure is to solve the above problem, and to provide a projection lens unit and a projection display apparatus capable of improving color uniformity of an image to be projected.

In order to achieve the above object, a projection lens unit of the present disclosure is a projection lens unit that enlarges and projects image light output from an image forming unit onto a projection target, the image light including first light and second light having a longer wavelength band than the first light. The projection lens unit includes a plurality of lenses coated with a first antireflection coating, and a wavelength selection filter having a first region in a center of the wavelength selection filter through which an optical axis passes and a second region around the first region. In the wavelength selection filter, a transmittance of the first light in the second region is lower than a transmittance of the first light in the first region.

Further, a projection lens unit according to another aspect of the present disclosure is a projection lens unit that enlarges and projects image light output from an image forming unit onto a projection target, the image light including first light and second light having a longer wavelength band than the first light. The projection lens unit includes a plurality of lenses coated with a first antireflection coating, and a wavelength selection filter having a first region in a center of the wavelength selection filter through which an optical axis passes and a second region around the first region. In the wavelength selection filter, a transmittance of the second light in the first region is lower than a transmittance of the second light in the second region.

Furthermore, a projection display apparatus of the present disclosure includes any one of the projection lens units described above, a light source unit that emits light, and an image forming unit that outputs image light using light from the light source unit.

It is possible to provide a projection lens unit and a projection display apparatus capable of improving color uniformity of an image to be projected.

BRIEF DESCRIPTION OF THE DRAWINGS

FIG. 2 is a graph illustrating spectral transmittances for respective optical paths of the entire projection lens unit according to the comparative example;

FIG. 3 is a graph illustrating a difference in transmittance between light on an optical axis of the projection lens unit according to the comparative example and light on an optical path at a maximum angle of view;

DETAILED DESCRIPTIONS

Hereinafter, exemplary embodiments will be described in detail with reference to the drawings as appropriate. However, unnecessarily detailed description may be omitted. For example, the detailed description of already well-known matters and the redundant description of configurations substantially identical to already-described configurations may be omitted. This is to avoid unnecessary redundancy in the following description and to facilitate understanding by those skilled in the art.

Note that the accompanying drawings and the following description are provided for those skilled in the art to fully understand the present disclosure, and are not intended to limit the subject matter recited in the claims.

First, problems of the projection lens unit of the present disclosure will be described in more detail with reference to FIG. 1. The inventors have newly found a cause of impairing color uniformity by the projection lens unit. That is, the projection lens unit includes a plurality of lenses, and an incident angle of image light with respect to each lens surface tends to change depending on an angle of view. An antireflection coating is formed on the surface of each lens, and color uniformity is impaired from a center to a periphery of an image on a projection target due to the incident angle dependence on the antireflection coating.

Figure 1:
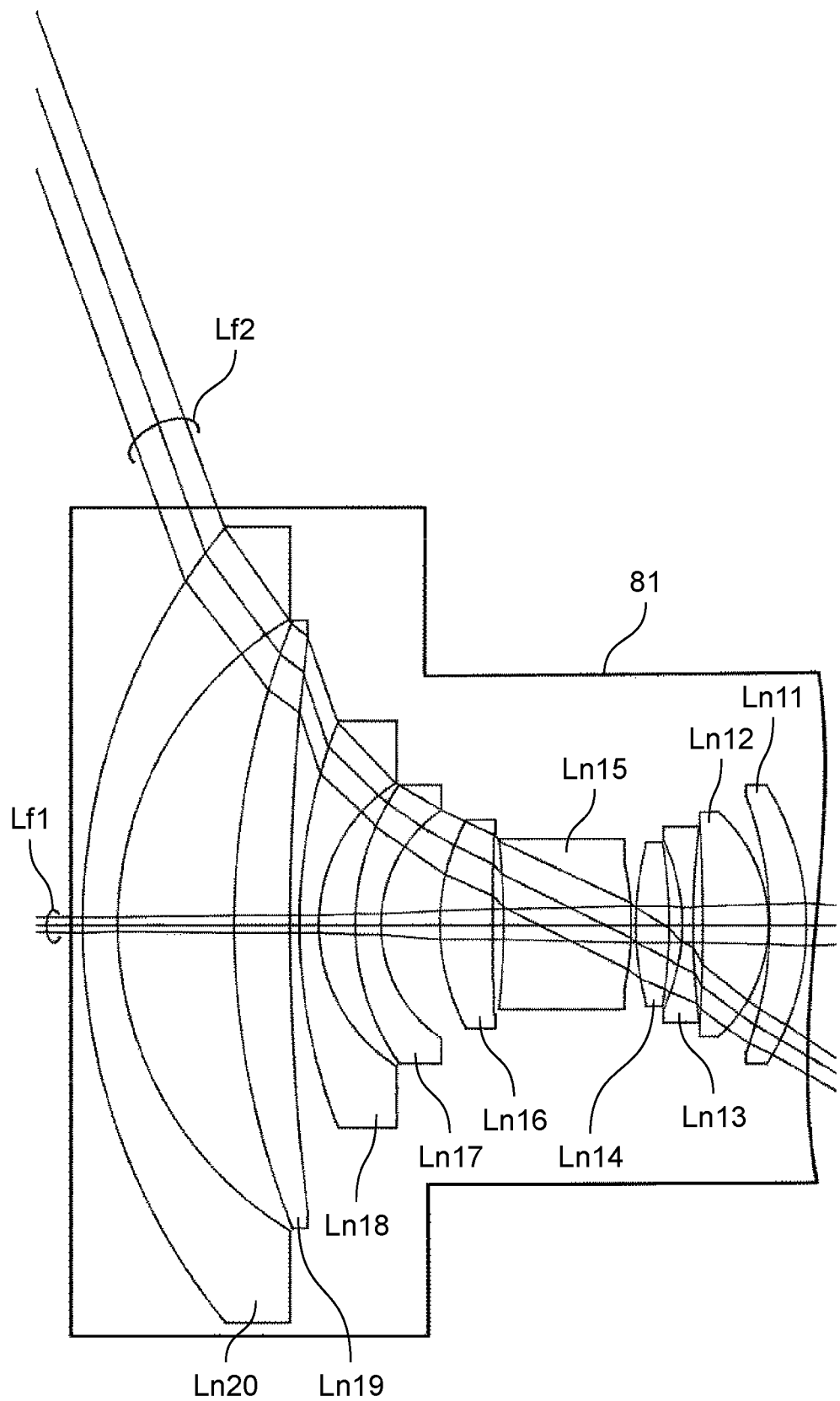
FIG. 1 is a partially enlarged view of a projection lens unit according to a comparative example.

FIG. 1 is a partially enlarged view illustrating a configuration of a part of projection lens unit 81 in a comparative example. Projection lens unit 81 includes a plurality of lenses for enlarging image light and reducing aberration of the image light. Projection lens unit 81 includes, for example, about 10 to 30 lenses. In FIG. 1, among the plurality of lenses, lenses Ln11 to Ln20 on a side of a screen side are illustrated. An antireflection coating is formed on a light incident surface and a light emitting surface of each of lenses Ln11 to Ln20.

In the case of optical path Lf1 on an optical axis of projection lens unit 81, an incident angle of light on each of lenses Ln11 to Ln20 is close to 0 degrees. On the other hand, in the case of optical path Lf2 having a maximum angle of view of projection lens unit 81, an incident angle of light on each of lenses Ln11 to Ln20 increases. For example, incident angles of light on lens Ln13 and lens Ln19 are very large, and incident angles of light are very large at a plurality of positions of lenses Ln11 to Ln20 in this manner.

The antireflection coating formed on each of lenses Ln11 to Ln20 has a characteristic that a wavelength band for suppressing a reflectance is shifted to a side of a short wavelength when the incident angle of light is large. When the incident angle of light is large, for example, the reflectance of light in a red wavelength band increases, and the reflectance of light in a blue wavelength band decreases. Therefore, when red light is propagated through an optical path having a large angle of view, an amount of reflected light becomes larger than that of the optical path on the optical axis, and a peripheral region of a projected image becomes a bluish image than a central region.

FIG. 2 is a graph illustrating spectral transmittances for respective optical paths of the entire projection lens unit according to the comparative example. Therefore, FIG. 2 illustrates integrated values of transmittances of all the lenses of the projection lens unit. A spectral transmittance of the light on the optical axis is approximately 90% with respect to light having a wavelength of 450 nm to 650 nm, and thus the chromaticity on the optical axis of the projected image is uniform. On the other hand, a spectral transmittance of the light on optical path Lf2 having the maximum angle of view is approximately 65% with respect to light having a wavelength between 450 nm and 600 nm inclusive, whereas a transmittance of light having a wavelength more than or equal to 600 nm gradually decreases. Therefore, uniformity of chromaticity in the vicinity of the maximum angle of view of the projected image is deteriorated.

FIG. 3 is a graph illustrating a difference in transmittance between light of optical path Lf1 on the optical axis of projection lens unit 81 according to the comparative example and light of optical path Lf2 on the maximum angle of view. As the light transmitted through projection lens unit 81 has a longer wavelength, the difference in transmittance between optical path Lf1 on the optical axis and optical path Lf2 on the maximum angle of view tends to increase, which is a factor of the color change of the image projected on the screen. The projection lens unit and the projection display apparatus of the present disclosure have a configuration that solves such a problem.

First Exemplary Embodiment

[1-1. Configuration of Projection Lens Unit and Projection Display Apparatus]

Figure 4:
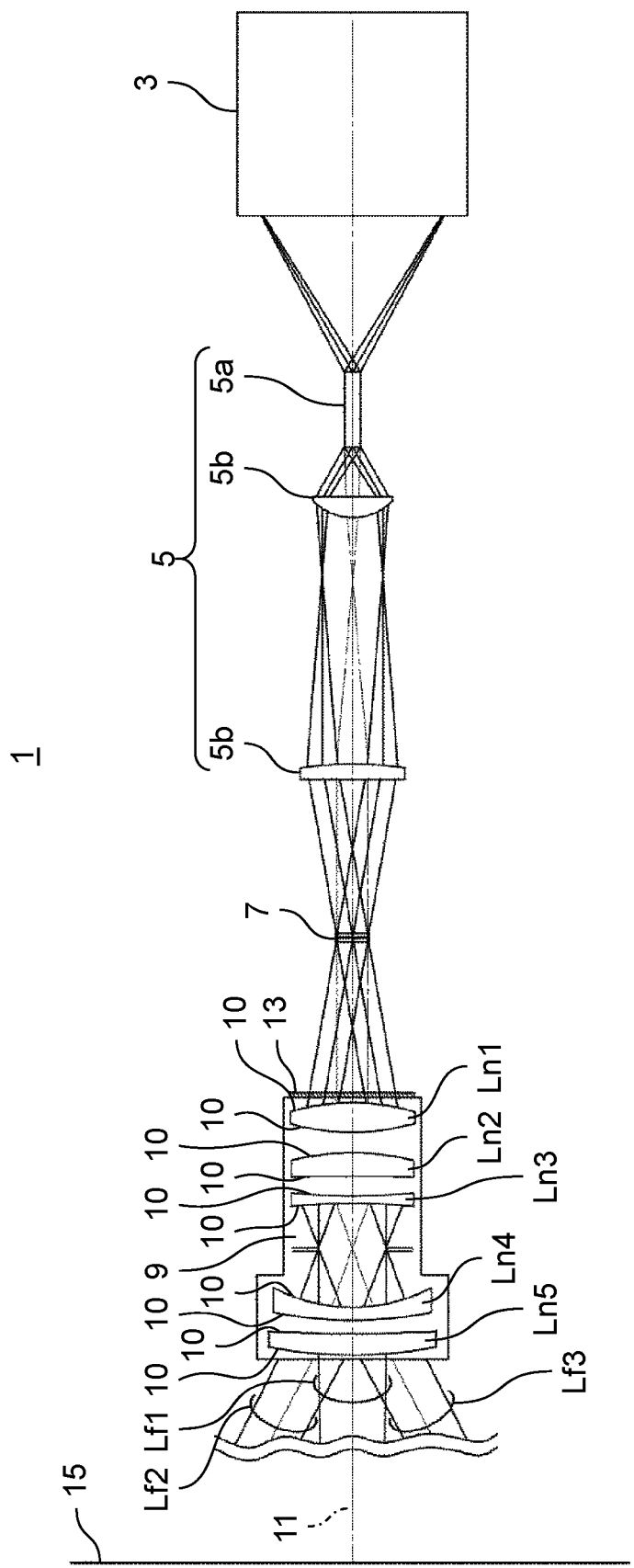
FIG. 4 is a diagram illustrating a configuration of a projection display apparatus according to a first exemplary embodiment.
Figure 5:
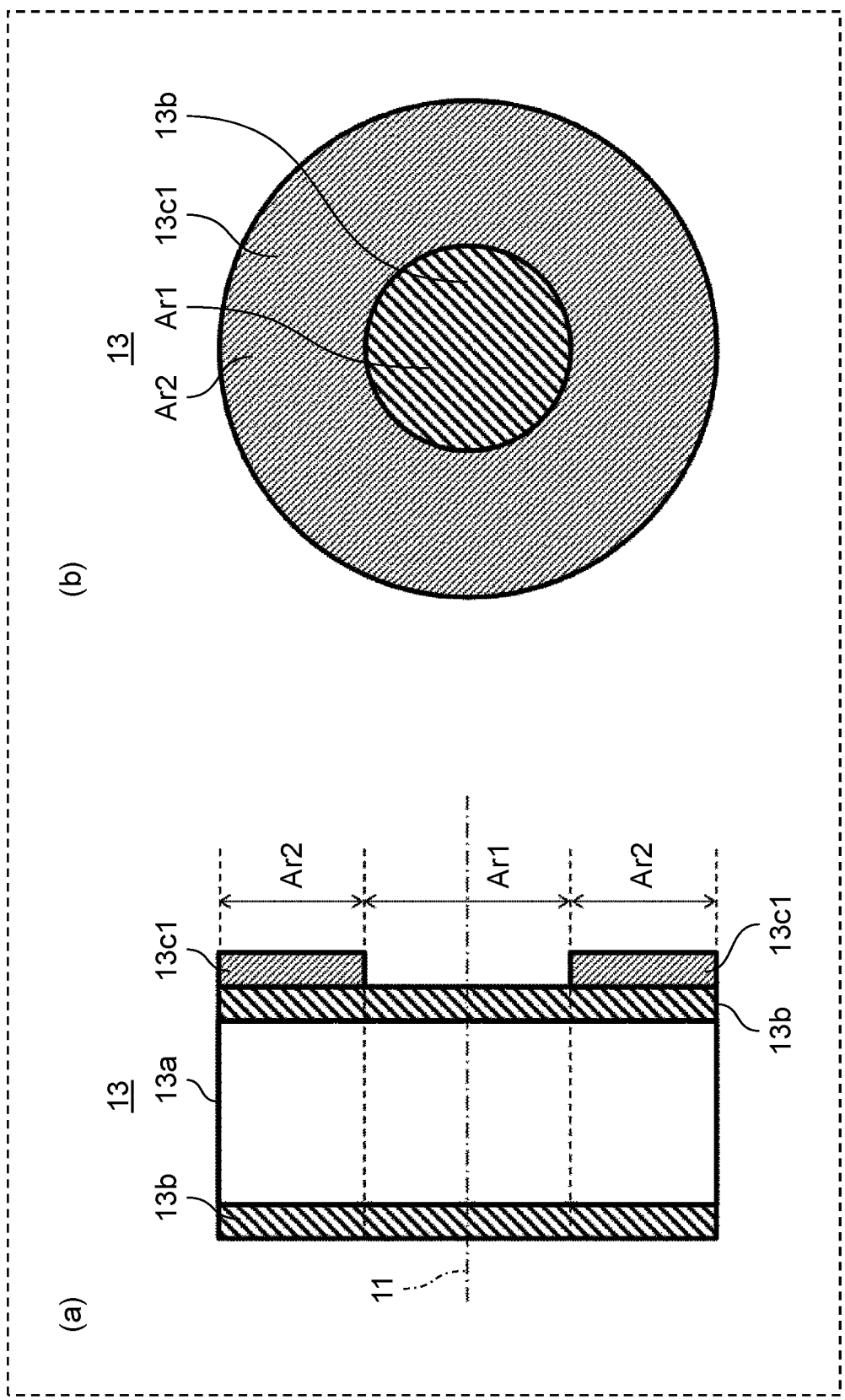
FIG. 5 is a diagram illustrating a configuration of a wavelength selection filter according to the first exemplary embodiment.

Hereinafter, a projection lens unit and a projection display apparatus according to a first exemplary embodiment of the present disclosure will be described. FIG. 4 is a diagram illustrating a configuration of projection display apparatus 1 according to the first exemplary embodiment of the present disclosure. FIG. 5 is a diagram illustrating a configuration of wavelength selection filter 13 of projection display apparatus 1 of the first exemplary embodiment. Part (a) of FIG. 5 is a cross-sectional view of wavelength selection filter 13, and part (b) of FIG. 5 is a front view of wavelength selection filter 13.

As illustrated in FIG. 4, projection display apparatus 1 according to the exemplary embodiment of the present disclosure includes light source unit 3 that emits light, illumination optical system 5, image forming unit 7 that outputs image light by using light from light source unit 3, and projection lens unit 9.

Light source unit 3 includes a light source element, and a condensing optical system that condenses light output from the light source element. As the light source element, a discharge lamp, a solid laser, an LED, or the like is generally used. Light having different wavelengths may be emitted from light source unit 3 in a time-division manner, or white light may be constantly emitted.

Illumination optical system 5 includes an integrator element 5a that equalizes an illuminance distribution of output light output from light source unit 3, and relay lens 5b including a plurality of lenses that efficiently illuminates image forming unit 7 with light emitted from integrator element 5a. Although a rod prism is illustrated as an example of the integrator element 5a in FIG. 4, a system using a lens array may be adopted.

Image forming unit 7 is a light valve as a light modulator, and modulates incident light in a visible light band to form image light. Image forming unit 7 may include, for example, either a transmissive or reflective liquid crystal display element that forms an image by controlling a polarization component of light, or a reflective digital micromirror device (DMD) element that forms an image by controlling a traveling direction of light by a micromirror.

Image forming unit 7 emits light incident from light source unit 3 and illumination optical system 5, for example, as image light of first to third light of three wavelength bands. The image light is light in a visible light band, and the first light is, for example, light in a blue wavelength band, and has a wavelength band between 430 nm and 500 nm inclusive. The second light is, for example, light in a red wavelength band, and has a wavelength band between 600 nm and 670 nm inclusive. The third light is, for example, light in a green wavelength band, and has a wavelength band more than 500 nm and less than 600 nm.

Projection lens unit 9 includes a plurality of lenses Ln1 to Ln5 and a wavelength selection filter 13. The output light from image forming unit 7 is enlarged and projected on screen 15. In FIG. 4, five lenses Ln1 to Ln5 are illustrated in projection lens unit 9, but this is only illustrated in a simplified manner. Therefore, projection lens unit 9 includes, for example, about 10 to 30 lenses, and may include lenses Ln11 to Ln20 as illustrated in FIG. 1. Due to the plurality of lenses, a maximum angle of view of projection lens unit 9 is more than or equal to 60 degrees. Further, an incident surface and an emission surface of each of lenses Ln1 to Ln5 of projection lens unit 9 are coated with first antireflection coating 10. Thus, light incident on each of lenses Ln1 to Ln5 can be prevented from being reflected by each of lenses Ln1 to Ln5 and becoming stray light. First antireflection coating 10 is, for example, a coating in which dielectric coatings are stacked.

In FIG. 4, wavelength selection filter 13 is disposed on a side of image forming unit 7 of projection lens unit 9, but may be disposed on a side of screen 15. In FIG. 4, wavelength selection filter 13 is disposed closer to image forming unit 7 than lens Ln1 disposed closest to image forming unit 7, but may be disposed in the vicinity of lens Ln1 disposed closest to image forming unit 7. For example, wavelength selection filter 13 may be disposed between lens Ln1 and lens Ln2. As described above, "disposed on a side of image forming unit 7" includes not only a case where projection lens unit 9 is disposed at an end on a side of image forming unit 7 of projection lens unit 9 but also a case where projection lens unit 9 is disposed in the vicinity of the end. Further, similarly, "disposed on a side of screen 15" includes not only a case where projection lens unit 9 is disposed at an end on a side of screen 15 but also a case where projection lens unit 9 is disposed in the vicinity of the end. For example, wavelength selection filter 13 may be disposed closer to screen 15 than lens Ln5 disposed closest to screen 15, or may be disposed between lens Ln4 and lens Ln5.

Wavelength selection filter 13 is disposed, for example, at a position sufficiently away from an image surface of an image of image forming unit 7, that is, at a position sufficiently defocused, and at a position where light beams of respective angles of view are separated as much as possible. In the case of such an arrangement, a difference in the incident angle between optical axis 11 and the maximum angle of view can be reduced, and in the case of being disposed closest to image forming unit 7, a size of wavelength selection filter 13 can be reduced, and the dependency on the incident angle with respect to wavelength selection filter 13 can also be reduced. Further, it is possible to continuously apply a filtering action to the image light transmitted through wavelength selection filter 13 according to the angle of view. Wavelength selection filter 13 may be disposed on a side of screen 15 of projection lens unit 9, but in this case, the size of wavelength selection filter 13 increases.

[1-2. Configuration of Wavelength Selection Filter]

A configuration of wavelength selection filter 13 will be described with reference to FIG. 5. In wavelength selection filter 13, a transmittance of light varies depending on each wavelength band of first region Ar1 at a center through which optical axis 11 passes and second region Ar2 around first region Ar1. A spectral transmittance of wavelength selection filter 13 changes rotationally symmetrically from optical axis 11 of projection lens unit 9. Note that "changing rotationally symmetrically from optical axis 11" includes changing rotationally symmetrically around not only optical axis 11 but also the vicinity of optical axis 11. In the first exemplary embodiment, a transmittance of the first light in annular second region Ar2 is lower than a transmittance of the first light in circular first region Ar1. The transmittance of the second light in each of first region Ar1 and second region Ar2 is substantially the same.

Wavelength selection filter 13 includes transparent substrate 13a, second antireflection coating 13b formed on each of light incident and light emitting surfaces of transparent substrate 13a, and first wavelength selection coating 13c1.

Transparent substrate 13a transmits image light from image forming unit 7. Transparent substrate 13a is, for example, a resin plate or a glass plate.

Second antireflection coating 13b reduces reflection of image light incident on transparent substrate 13a. Second antireflection coating 13b has a circular shape and is formed in at least a light transmission region of the incident surface and the emission surface of transparent substrate 13a.

Figure 6:
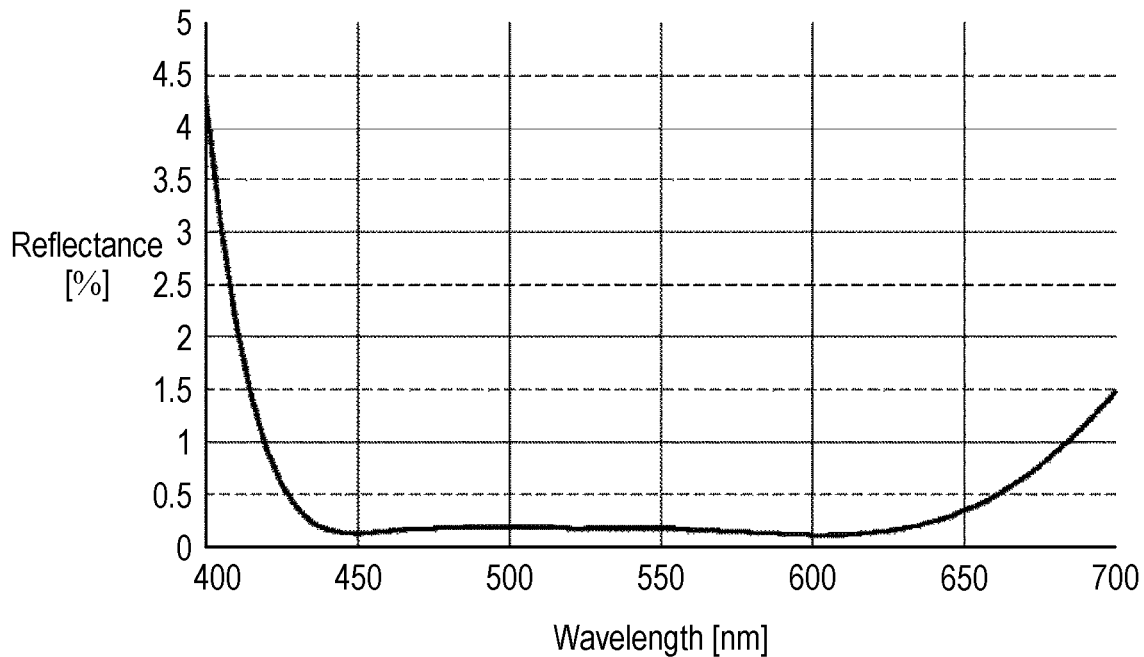
FIG. 6 is a graph illustrating spectral reflectances of the first and second antireflection coatings according to the first exemplary embodiment.

FIG. 6 is a graph illustrating spectral reflectances of first and second antireflection coatings 10, 13b according to the first exemplary embodiment. As illustrated in FIG. 6, the spectral reflectances of first and second antireflection coatings 10, 13b are less than or equal to 1% over the entire visible light wavelength band between approximately 430 nm and 670 nm inclusive.

In first wavelength selection coating 13c1 of the first exemplary embodiment, a transmittance of the first light is lower than that of the second light. First wavelength selection coating 13c1 is, for example, a dielectric multilayer coating. First wavelength selection coating 13c1 has, for example, an annular shape in which a through hole is formed in a central region, and a region of the through hole corresponds to first region Ar1. When the center of first wavelength selection coating 13c1 is aligned with the center of second antireflection coating 13b and formed on second antireflection coating 13b, first wavelength selection coating 13c1 can be disposed on second region Ar2.

Figure 7:
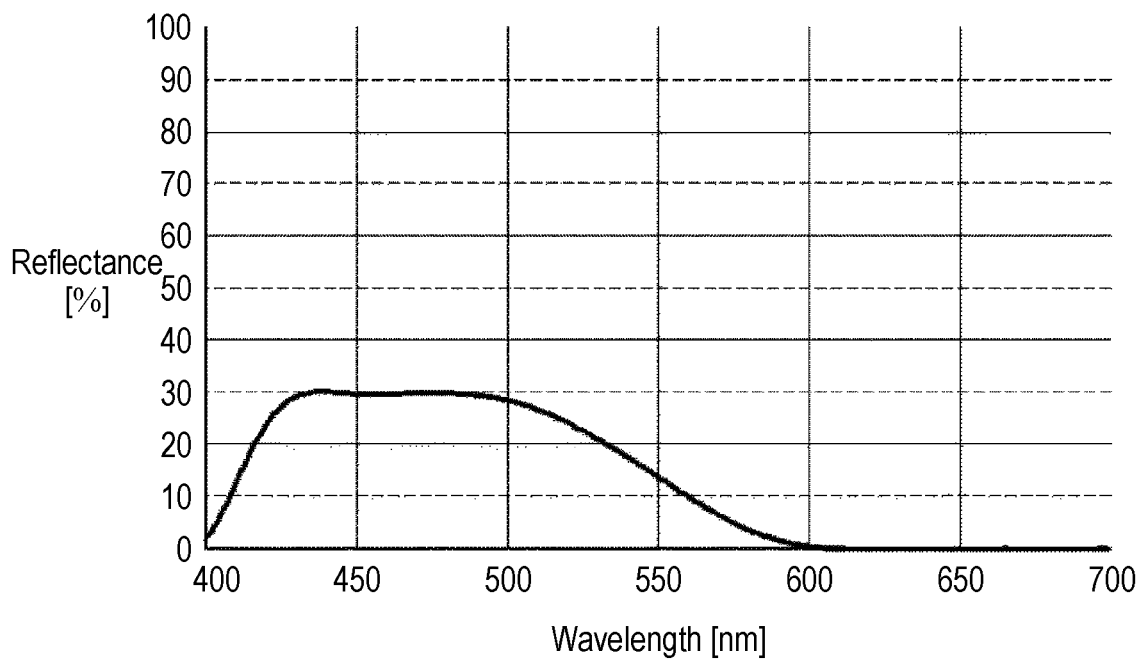
FIG. 7 is a graph illustrating a spectral reflectance of the first wavelength selection coating according to the first exemplary embodiment.

FIG. 7 is a graph illustrating a spectral reflectance of first wavelength selection coating 13c1 according to the first exemplary embodiment. As illustrated in FIG. 7, the spectral reflectance of first wavelength selection coating 13c1 reflects about 30% of an amount of light in the blue wavelength band between about 430 nm and 500 nm inclusive.

In wavelength selection filter 13, a difference between the transmittance of the first light in first region Ar1 and the transmittance of the first light in second region Ar2 ranges from 60% to 80% inclusive.

According to projection lens unit 9 of the first exemplary embodiment, even if a part of the light in the red wavelength band is reflected due to the property of second antireflection coating 13b in a region having a large angle of view in the incident image light, first wavelength selection coating 13c1 reflects a part of the light in the blue wavelength band, so that chromaticity uniformity can be improved. Further, since a part of the light in the blue wavelength band having low relative luminosity and a small influence in terms of illuminance is reflected, it is possible to improve chromaticity uniformity while suppressing a decrease in brightness of an entire projected image.

[1-3. Effects and the Like]

As described above, projection lens unit 9 according to the first exemplary embodiment enlarges and projects image light, which is output from image forming unit 7 and includes the first light and the second light having a longer wavelength band than the first light, onto screen 15 as a projection target. Projection lens unit 9 includes a plurality of lenses Ln1 to Ln5 coated with first antireflection coating 10, and wavelength selection filter 13 having central first region Ar1 through which the optical axis passes and second region Ar2 around first region Ar1. In wavelength selection filter 13, the transmittance of the first light is lower than that of the second light in second region Ar2 than in first region Ar1.

Consequently, even if a part of the second light is reflected by the property of first antireflection coating 10 with respect to the image light passing through the second region having the large angle of view in image light in projection lens unit 9, first wavelength selection coating 13c1 reflects a part of the first light, so that the uniformity of chromaticity of the image projected on screen 15 can be improved.

Further, according to the first exemplary embodiment, projection display apparatus 1 includes projection lens unit 9 described above, light source unit 3 that emits light, and image forming unit 7 that outputs image light using light from light source unit 3. As a result, it is possible to provide projection display apparatus 1 capable of improving the uniformity of the chromaticity of the image projected on screen 15.

Figure 8:
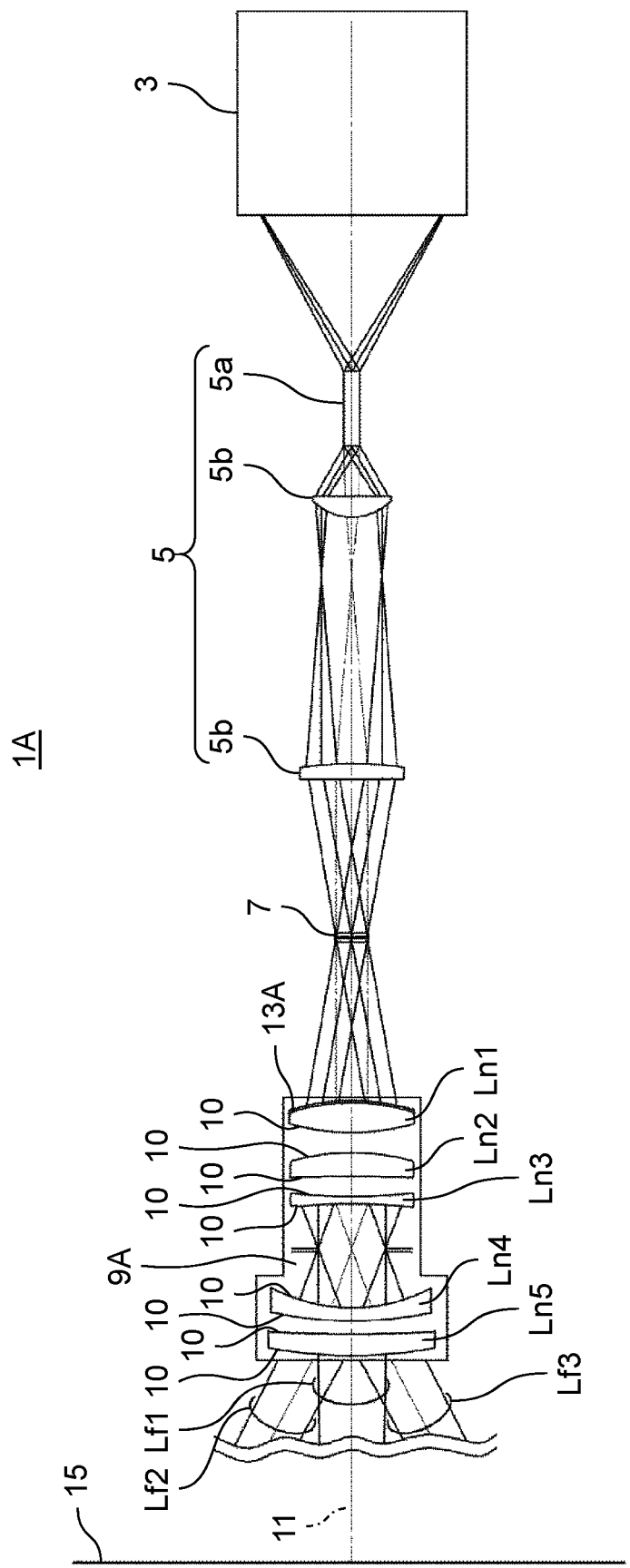
FIG. 8 is a diagram illustrating a configuration of a projection display apparatus according to a modification example of the first exemplary embodiment.
Figure 9:
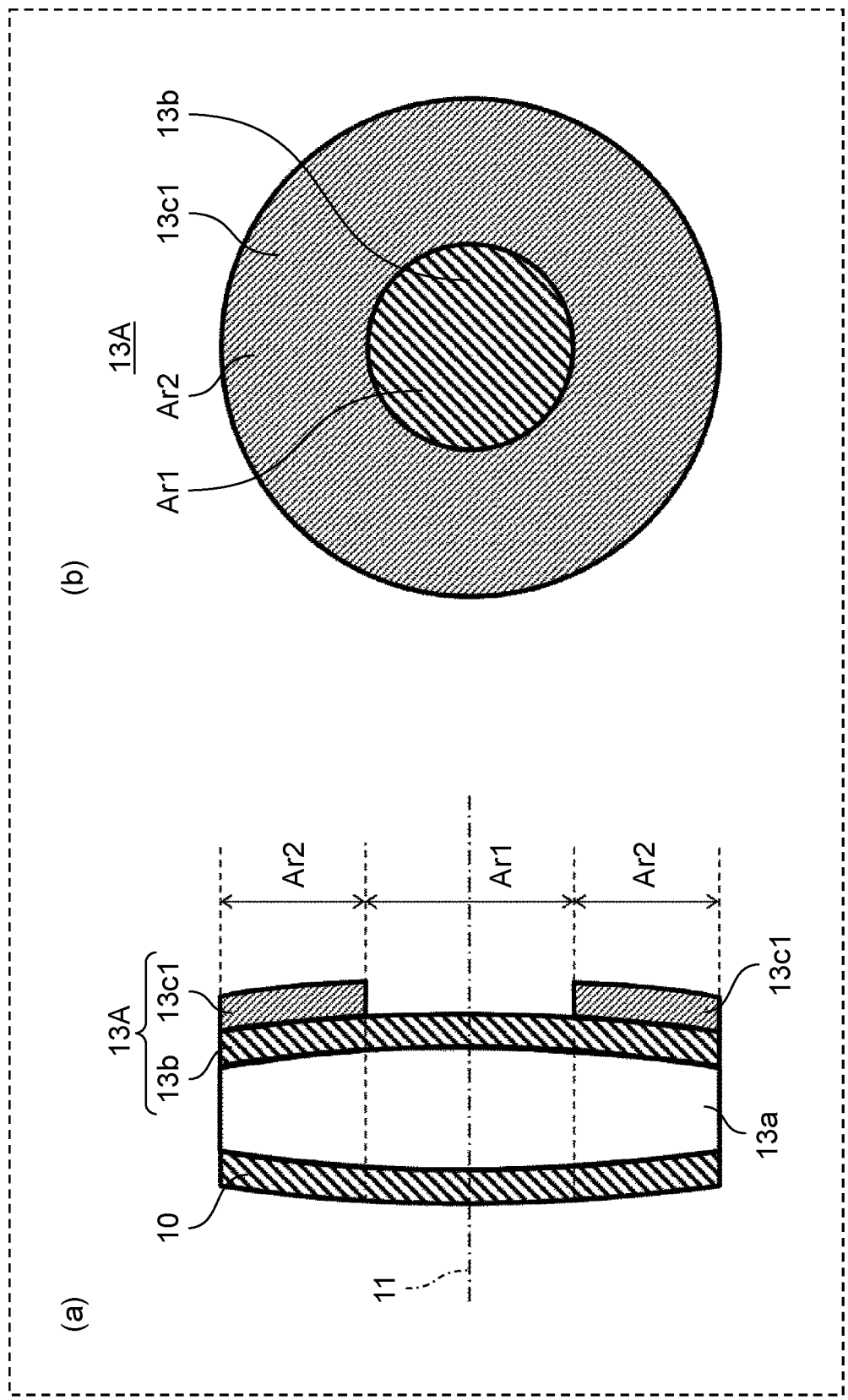
FIG. 9 is a diagram illustrating a configuration of a wavelength selection filter according to the modification example of the first exemplary embodiment.

Next, a modification example of the first exemplary embodiment will be described with reference to FIGS. 8 and 9. FIG. 8 is a diagram illustrating a configuration of projection display apparatus 1A according to a modification example of the first exemplary embodiment. FIG. 9 is a diagram illustrating a configuration of wavelength selection filter 13A according to the modification example of the first exemplary embodiment, in which part (a) of FIG. 9 is a cross-sectional view of wavelength selection filter 13A, and part (b) of FIG. 9 is a front view of wavelength selection filter 13A.

Wavelength selection filter 13A in the modification example of the first exemplary embodiment is formed on a surface of lens Ln1 of projection lens unit 9A. For example, wavelength selection filter 13A may be formed on an incident surface of lens Ln1 closest to image forming unit 7 as illustrated in FIG. 8, or may be formed on an emission surface of lens Ln1. Further, not limited to lens Ln1, it may be formed on an incident surface or an emission surface of lens Ln2 or Ln3 on a side of image forming unit 7. In addition, wavelength selection filter 13A may be formed on an incident surface or an emission surface of any of lenses Ln4 to Ln5 on a side of screen 15.

Wavelength selection filter 13A includes second antireflection coating 13b formed on the incident surface of lens Ln1, and first wavelength selection coating 13c1 formed in second region Ar2 around first region Ar1 of second antireflection coating 13b.

Even with such a configuration, as in the first exemplary embodiment, it is possible to improve the uniformity of chromaticity of an image projected on screen 15.

Second Exemplary Embodiment

Figure 10:
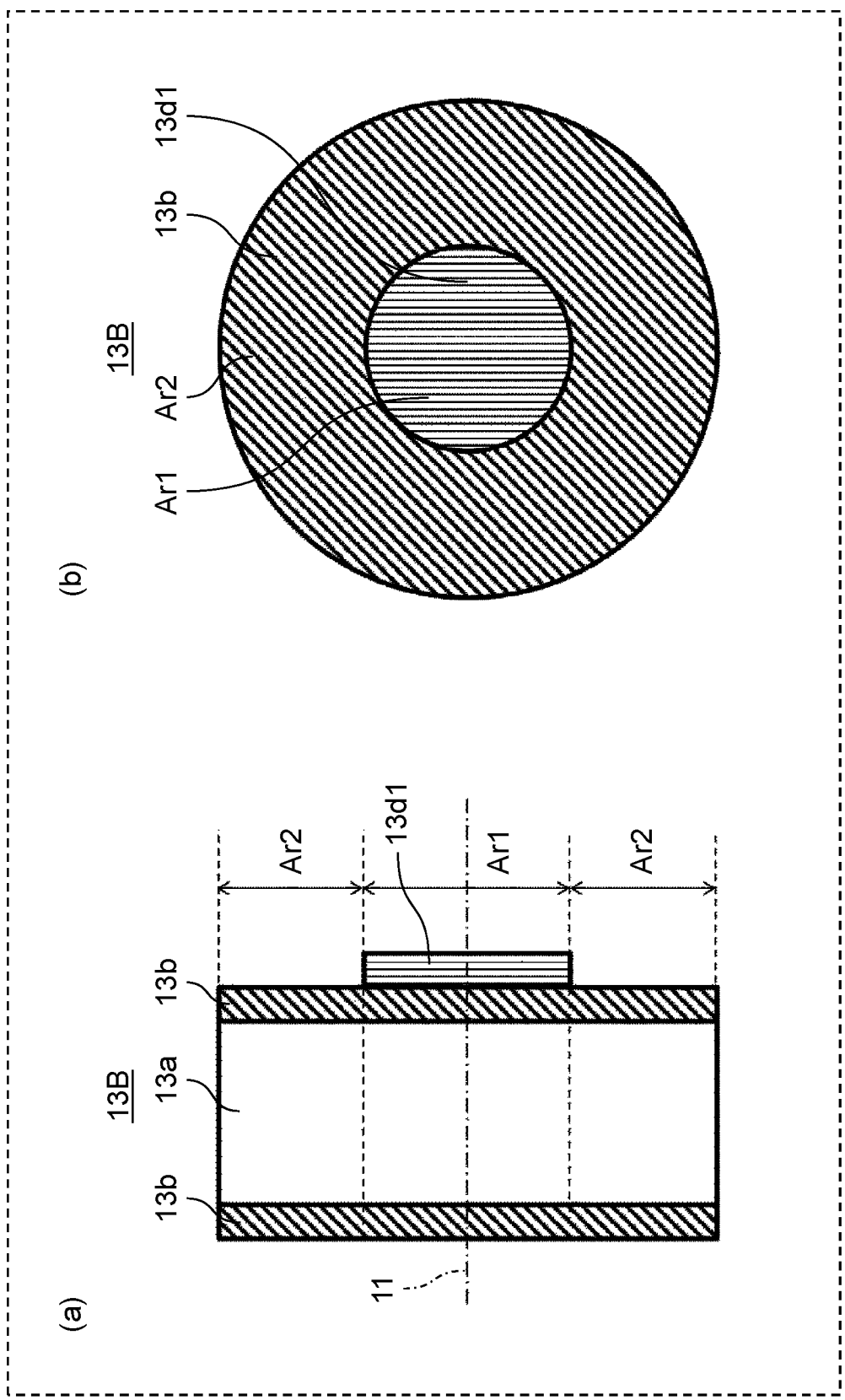
FIG. 10 is a diagram illustrating a configuration of a wavelength selection filter according to a second exemplary embodiment.

Next, a projection lens unit and a projection display apparatus according to a second exemplary embodiment will be described with reference to FIG. 10. FIG. 10 is a diagram illustrating a configuration of wavelength selection filter 13B according to the second exemplary embodiment. Part (a) of FIG. 10 is a cross-sectional view of wavelength selection filter 13B, and part (b) of FIG. 10 is a front view of wavelength selection filter 13B.

In wavelength selection filter 13B of the second exemplary embodiment, while wavelength selection filter 13 of the first exemplary embodiment has first wavelength selection coating 13c1 disposed in second region Ar2, second wavelength selection coating 13d1 is disposed in first region Ar1. Except for this point and the points described below, the projection lens unit and the projection display apparatus of the second exemplary embodiment have a common configuration to the projection lens unit and the projection display apparatus of the first exemplary embodiment.

Wavelength selection filter 13B includes second antireflection coating 13b disposed in first region Ar1 and second region Ar2 on an incident surface of transparent substrate 13a on a side of image forming unit 7. Second antireflection coating 13b has an annular exposed surface in front view.

Further, wavelength selection filter 13B includes second wavelength selection coating 13d1 in which a transmittance of the second light is lower than that of the first light. Second wavelength selection coating 13d1 is disposed on first region Ar1 of second antireflection coating 13b disposed on a side of image forming unit 7 of transparent substrate 13a. Second wavelength selection coating 13d1 has a circular shape in front view.

Figure 11:
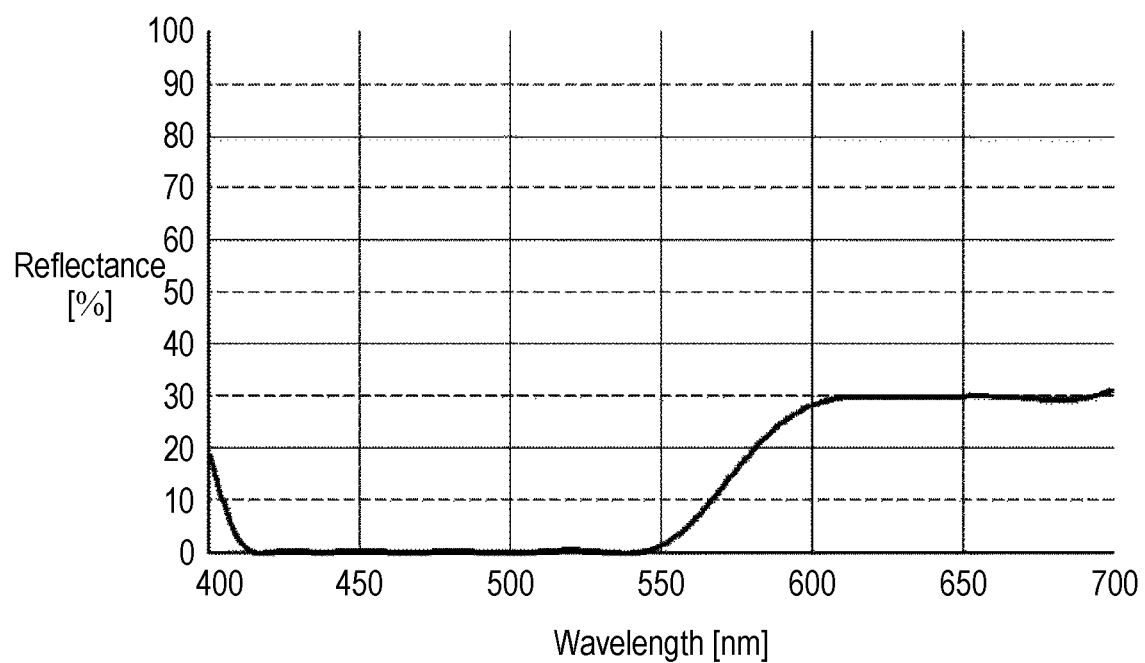
FIG. 11 is a graph illustrating a spectral reflectance of a second wavelength selection coating according to the second exemplary embodiment.

FIG. 11 is a graph illustrating a spectral reflectance of second wavelength selection coating 13d1 according to the second exemplary embodiment. As illustrated in FIG. 11, the spectral reflectance of second wavelength selection coating 13d1 reflects about 30% of an amount of light in the red wavelength band between approximately 600 nm and 670 nm inclusive.

In wavelength selection filter 13B, a difference between the transmittance of the second light in first region Ar1 and the transmittance of the second light in second region Ar2 ranges from 60% to 80% inclusive.

As described above, according to the projection lens unit including wavelength selection filter 13B of the second exemplary embodiment, since the reflectance of the second light is higher in first region Ar1 near the optical axis than in peripheral second region Ar2, the second light is reflected in first region Ar1. Further, since the second light transmitted through second region Ar2 is reflected by first antireflection coating 10 of the plurality of lenses Ln1 to Ln5, the image light projected onto screen 15 has a bluish color tone as a whole, and the chromaticity uniformity of the image can be improved. A part of the second light around the image is reflected by first antireflection coating 10 of the plurality of lenses Ln1 to Ln5, and a part of the second light near the image center is reflected by second wavelength selection coating 13d1, so that the uniformity of the luminance of the entire projected image light can also be improved.

As a modification example of the second exemplary embodiment, as in the modification example of the first exemplary embodiment, second antireflection coating 13b and second wavelength selection coating 13d1 of wavelength selection filter 13B may be formed on the incident surface or the emission surface of lens Ln1 on a side of image forming unit 7 of projection lens unit 9 of the first exemplary embodiment, or may be formed on the incident surface or the emission surface of lens Ln5 on a side of screen 15. In this case, the wavelength selection filter includes second antireflection coating 13b formed on the surface of lens Ln1, and second wavelength selection coating 13d1 formed on second antireflection coating 13b.

Third Exemplary Embodiment

Figure 12:
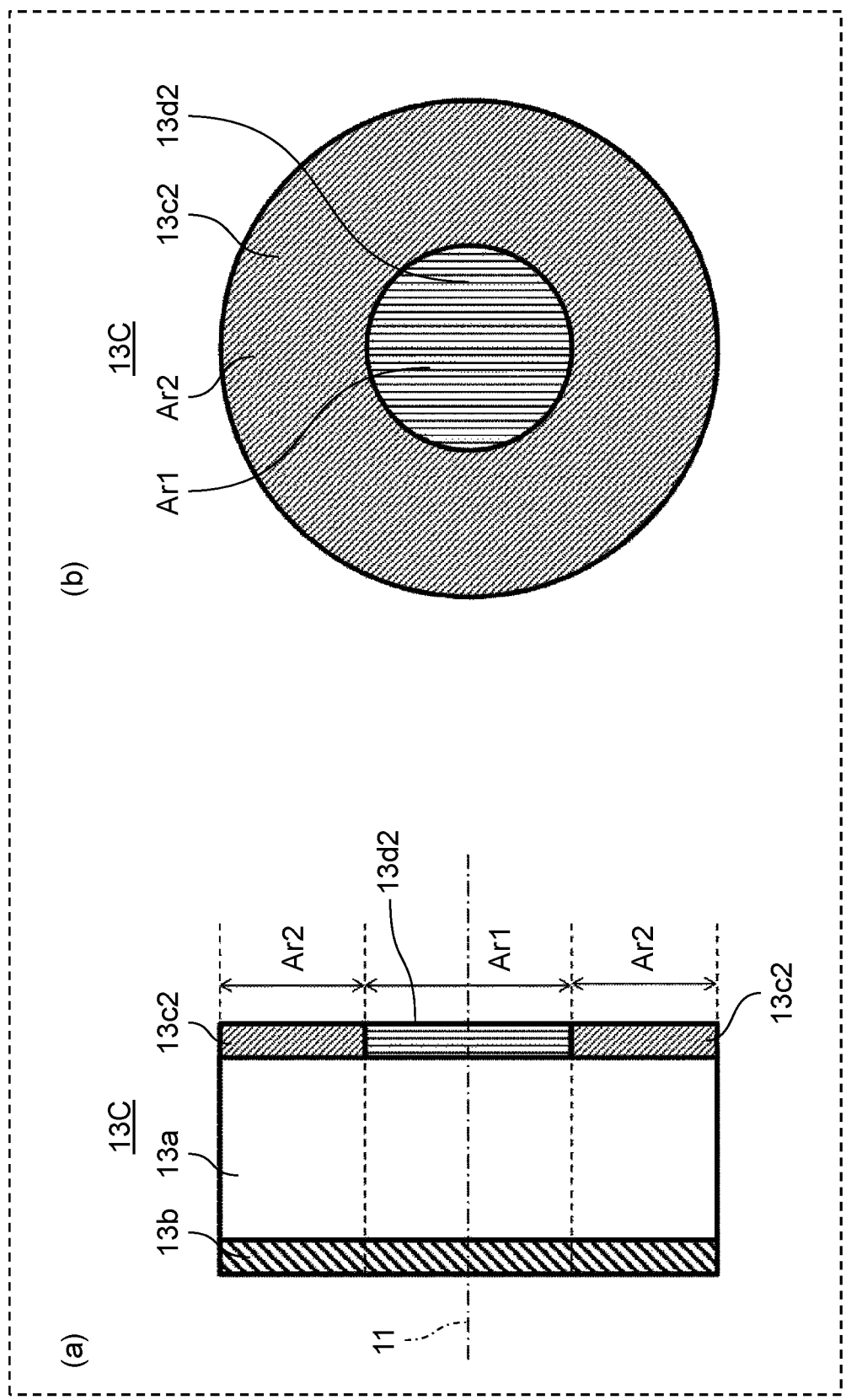
FIG. 12 is a diagram illustrating a configuration of a wavelength selection filter according to a third exemplary embodiment.

Next, a projection lens unit and a projection display apparatus according to a third exemplary embodiment will be described with reference to FIG. 12. FIG. 12 is a diagram illustrating a configuration of wavelength selection filter 13C according to the third exemplary embodiment. Part (a) of FIG. 12 is a cross-sectional view of wavelength selection filter 13C, and part (b) of FIG. 12 is a front view of wavelength selection filter 13C.

Wavelength selection filter 13C of the third exemplary embodiment has a configuration in which wavelength selection filter 13 of the first exemplary embodiment and wavelength selection filter 13B of the second exemplary embodiment are combined. Except for this point and the points described below, the projection lens unit and the projection display apparatus of the third exemplary embodiment have a common configuration to the projection lens unit and the projection display apparatus of the first exemplary embodiment.

In wavelength selection filter 13C, second wavelength selection coating 13d2 is disposed on first region Ar1 on a side of image forming unit 7 of transparent substrate 13a, and first wavelength selection coating 13c2 is disposed on second region Ar2 on the side of image forming unit 7 of transparent substrate 13a. Therefore, second wavelength selection coating 13d2 and first wavelength selection coating 13c2 are disposed side by side in a radial direction, and first wavelength selection coating 13c2 is disposed around second wavelength selection coating 13d2.

Figure 13:
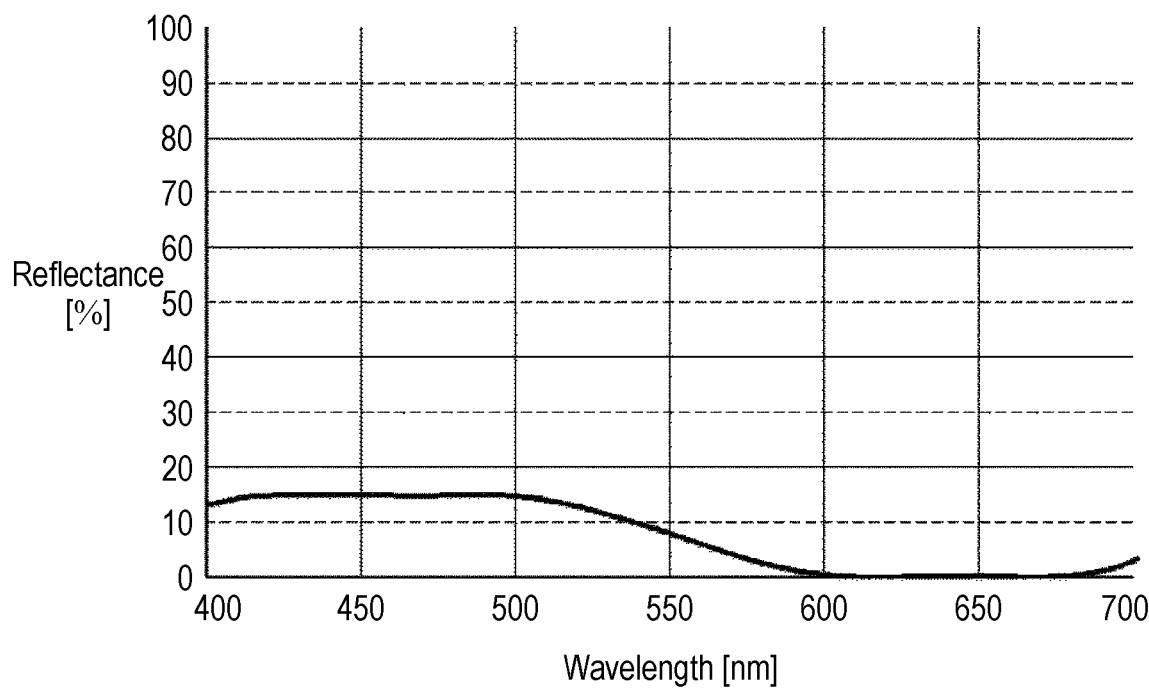
FIG. 13 is a graph illustrating a spectral reflectance of a first wavelength selection coating according to the third exemplary embodiment.

FIG. 13 is a graph illustrating a spectral reflectance of first wavelength selection coating 13c2 according to the third exemplary embodiment. As illustrated in FIG. 13, the spectral reflectance of first wavelength selection coating 13c2 reflects about 15% of an amount of light in the blue wavelength band between about 430 nm and 500 nm inclusive.

Figure 14:
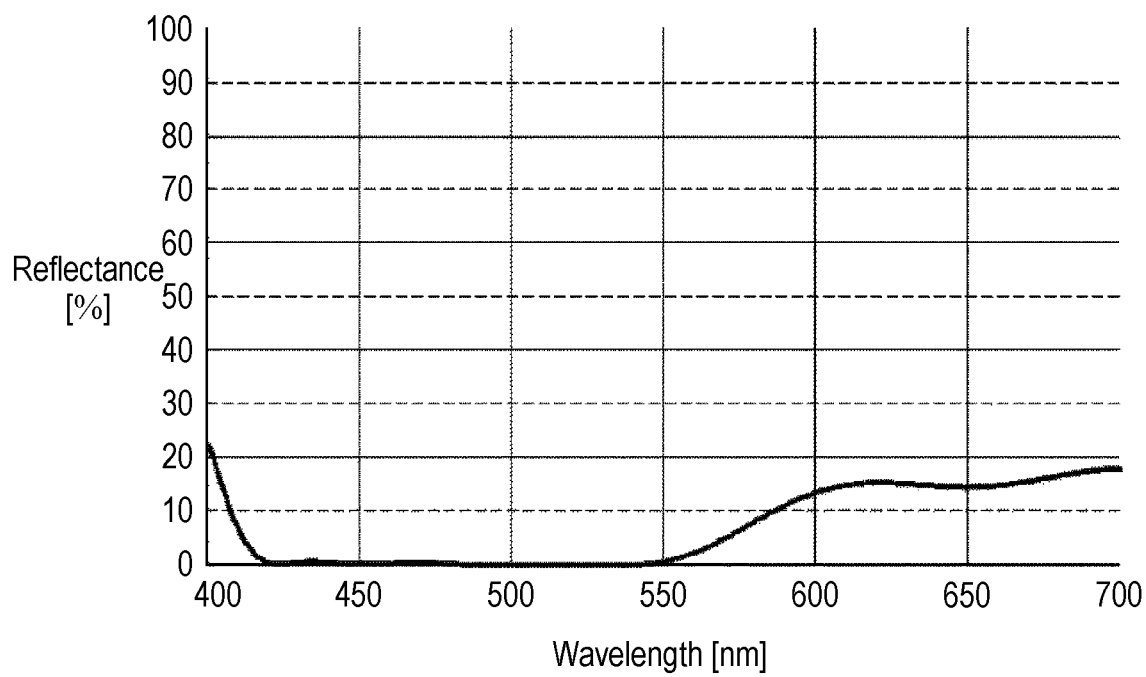
FIG. 14 is a graph illustrating a spectral reflectance of a second wavelength selection coating according to the third exemplary embodiment.

FIG. 14 is a graph illustrating a spectral reflectance of second wavelength selection coating 13d2 according to the third exemplary embodiment. As illustrated in FIG. 14, the spectral reflectance of second wavelength selection coating 13d2 reflects about 15% of an amount of light in the red wavelength band between approximately 600 nm and 670 nm inclusive.

As described above, according to the projection lens unit including wavelength selection filter 13C of the third exemplary embodiment, even if a part of the second light is reflected by the property of first antireflection coating 10 with respect to the image light passing through second region Ar2 having a large angle of view in the image light, first wavelength selection coating 13c2 reflects a part of the first light, so that the uniformity of the chromaticity of the image projected on screen 15 can be improved. Furthermore, since the reflectance of the second light is higher in first region Ar1 near the optical axis than in peripheral second region Ar2, the second light is reflected in first region Ar1. As described above, since a part of the first light is reflected in second region Ar2 and a part of the second light is reflected in first region Ar1, the amount of reflected light can be reduced as compared with the first and second exemplary embodiments, and the uniformity of the chromaticity of the image can be improved, the decrease in the brightness of the entire projected image can be suppressed, and the difference in brightness between the center and the periphery of the projected image can be reduced in a well-balanced manner.

Further, as a modification example of the third exemplary embodiment, as in the modification example of the first exemplary embodiment, second wavelength selection coating 13d2 disposed on first region Ar1 of wavelength selection filter 13C and first wavelength selection coating 13c2 disposed on second region Ar2 may be formed on the incident surface or the emission surface of lens Ln1 on a side of image forming unit 7 of projection lens unit 9 of the first exemplary embodiment, or may be formed on the incident surface or the emission surface of lens Ln5 on a side of screen 15. In this case, the wavelength selection filter includes second wavelength selection coating 13d2 disposed on first region Ar1, and first wavelength selection coating 13c2 disposed on second region Ar2.

Other Exemplary Embodiments (1) In each of the above described exemplary embodiments, first wavelength selection coatings 13c1, 13c2 have a property of reflecting a part of light in the blue wavelength band, but may be a coating having a property of absorbing a part of light in the blue wavelength band. In this case, if coating thicknesses of first wavelength selection coatings 13c1, 13c2 are increased, the transmittance of light in the blue wavelength band decreases. Therefore, by gradually increasing the coating thicknesses of first wavelength selection coatings 13c1, 13c2 in the radial direction, the spectral transmittances of first wavelength selection coatings 13c1, 13c2 may be changed stepwise along the radial direction. As a result, the chromaticity can be made uniform more continuously from the center of the projected image toward the peripheral part. Further, similarly, second wavelength selection coatings 13d1, 13d2 may be coatings having a property of absorbing a part of light in the red wavelength band. In this case, if the coating thicknesses of second wavelength selection coatings 13d1, 13d2 are increased, the transmittance of light in the red wavelength band decreases. Therefore, by gradually increasing the coating thicknesses of second wavelength selection coatings 13d1, 13d2 in the radial direction toward optical axis 11, the spectral transmittances of second wavelength selection coatings 13d1, 13d2 may be changed stepwise along the radial direction.

Figure 15:
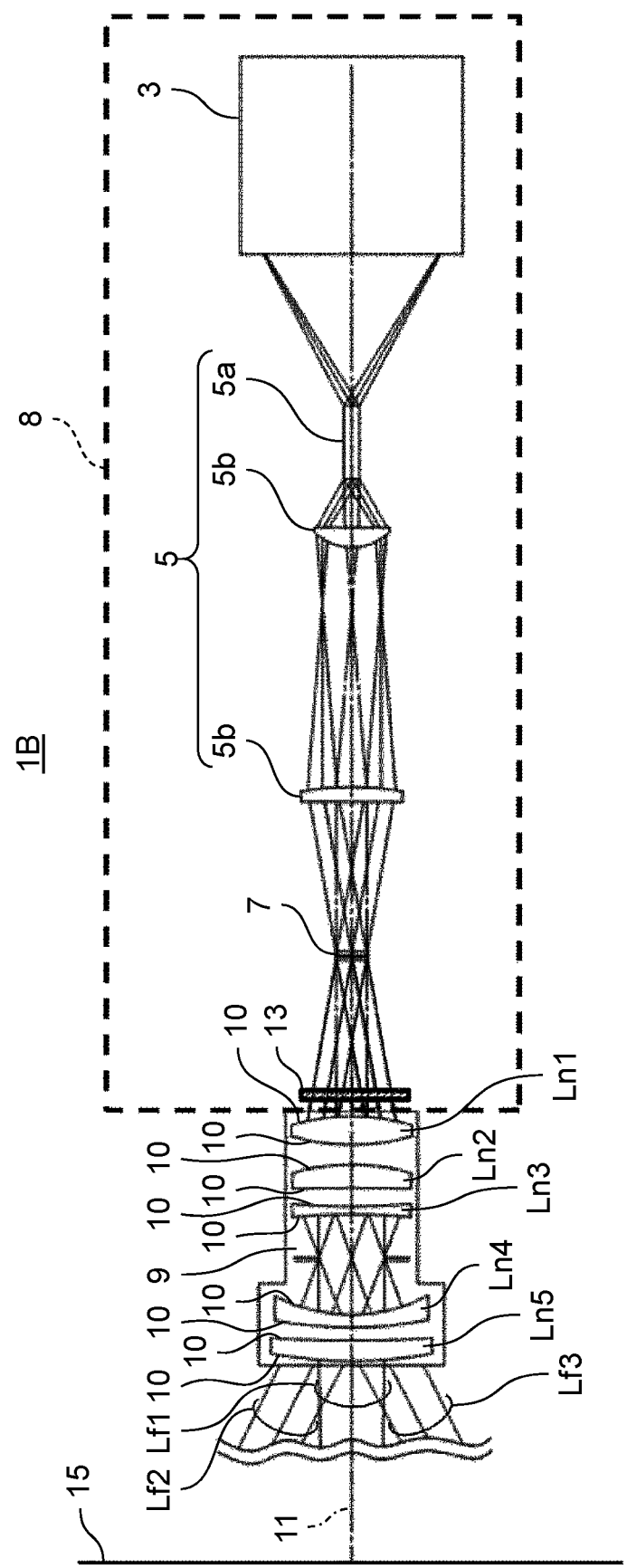
FIG. 15 is a diagram illustrating a configuration of a projection display apparatus according to a modification example.

(2) In each of the above described exemplary embodiments, wavelength selection filter 13 is provided in projection lens unit 9, but the present disclosure is not limited thereto. For example, as illustrated in FIG. 15, in housing 8 of projection display apparatus 1B, wavelength selection filter 13 may be disposed on an optical path between image forming unit 7 and projection lens unit 9. Housing 8 accommodates light source unit 3, illumination optical system 5, image forming unit 7, and wavelength selection filter 13, and projection lens unit 9 is detachably attached to housing 8. Wavelength selection filter 13 is fixed to housing 8.

Further, the wavelength selection filter accommodated in housing 8 is not limited to wavelength selection filter 13 of the first exemplary embodiment, and may be wavelength selection filter 13B of the second exemplary embodiment or wavelength selection filter 13C of the third exemplary embodiment. The above described effects can be obtained by each of the wavelength selection filters.

The above exemplary embodiment has been described above as being illustrative of the technique of the present disclosure. The attached drawings and the detailed descriptions have been presented for this purpose. Consequently, not only components that are essential for solving the problem but also components that are not essential for solving the problem may also be included in the components described in the accompanying drawings and the detailed description in order to exemplify the above technique. Therefore, when those non-essential components are described in the accompanying drawings and detailed description, the non-essential components should not be immediately acknowledged to be essential based on only the description.

Further, the technique in the present disclosure is not limited to the above described exemplary embodiments, and can also be applied to exemplary embodiments in which changes, replacements, additions, omissions, and the like are made. Furthermore, the constituent elements described in the exemplary embodiment can be combined to form a new exemplary embodiment.

In addition, the above exemplary embodiments are provided to exemplify the technique according to the present disclosure. Therefore, it is possible to make various changes, replacements, additions, omissions, for example, within the scope of the claims and equivalents thereof.

Outline of Exemplary Embodiments (1) A projection lens unit of the present disclosure is a projection lens unit that enlarges and projects image light, which is output from an image forming unit and includes first light and second light having a longer wavelength band than the first light, onto a projection target. The projection lens unit includes a plurality of lenses coated with a first antireflection coating, and a wavelength selection filter having a first region in a center of the wavelength selection filter through which an optical axis passes and a second region around the first region. In the wavelength selection filter, a transmittance of the first light in the second region is lower than a transmittance of the first light in the first region.

The plurality of lenses coated with the first antireflection coating reduces the transmittance of the second light passing through the second region to be lower than the transmittance of the first light, but the wavelength selection filter reduces the transmittance of the first light passing through the second region, so that the color uniformity of the image light projected onto the projection target can be improved. In addition, it is also possible to suppress a decrease in brightness of the entire projected image light.

(2) In the projection lens unit of (1), in the wavelength selection filter, the transmittance of the second light in the first region is lower than the transmittance of the second light in the second region. As a result, it is possible to suppress a decrease in brightness of the entire image light to be projected, reduce a difference in brightness between the center and the peripheral part of the image light to be projected, and improve color uniformity of the image light to be projected.

(3) Further, the projection lens unit of the present disclosure is a projection lens unit that enlarges and projects image light output from an image forming unit onto a projection target, the image light including first light and second light having a longer wavelength band than the first light. The projection lens unit includes a plurality of lenses coated with a first antireflection coating, and a wavelength selection filter having a first region in a center of the wavelength selection filter through which an optical axis passes and a second region around the first region. In the wavelength selection filter, a transmittance of the second light in the first region is lower than a transmittance of the second light in the second region.

The plurality of lenses coated with the first antireflection coating reduces the transmittance of the second light passing through the second region, but the wavelength selection filter also reduces the transmittance of the second light passing through the first region, so that the transmittance of the second light can be reduced with respect to the image light as a whole, and the color uniformity of the projected image light can be improved. In addition, since the transmittance of the second light decreases in both the first region and the second region, it is also possible to reduce a difference in brightness between the center and the peripheral part of the projected image light.

(4) In the projection lens unit according to any one of (1) to (3), the wavelength selection filter is disposed on a side of the image forming unit or on a side of the projection target of the projection lens unit.

(5) In the projection lens unit according to any one of (1) to (4), the wavelength selection filter is formed on an incident surface or an emission surface of a lens on a side of the image forming unit or on an incident surface or an emission surface of a lens on a side of the projection target in the projection lens unit.

(6) In the projection lens unit according to any one of (1) to (5), a spectral transmittance of the wavelength selection filter changes rotationally symmetrically from an optical axis of the projection lens unit.

(7) In the projection lens unit according to (1), in the wavelength selection filter, a difference between a transmittance of the first light in the first region and a transmittance of the first light in the second region ranges from 60% to 80% inclusive.

(8) In the projection lens unit according to (3), in the wavelength selection filter, a difference between a transmittance of the second light in the first region and a transmittance of the second light in the second region ranges from 60% to 80% inclusive.

(9) In the projection lens unit according to (1), the wavelength selection filter includes a first wavelength selection coating disposed in the second region and in which a transmittance of the first light is lower than a transmittance of the second light.

(10) In the projection lens unit according to (2), the wavelength selection filter includes a first wavelength selection coating disposed in the second region and in which a transmittance of the first light is lower than a transmittance of the second light, and a second wavelength selection coating disposed in the first region and in which a transmittance of the second light is lower than a transmittance of the first light.

(11) In the projection lens unit according to (3), the wavelength selection filter includes a second wavelength selection coating disposed in the first region and in which a transmittance of the second light is lower than a transmittance of the first light.

(12) In the projection lens unit according to (9), the wavelength selection filter includes a second antireflection coating having a circular shape in front view and disposed in the first region and the second region, and the first wavelength selection coating has an annular shape in front view and is disposed on the second antireflection coating.

(13) In the projection lens unit according to (11), the wavelength selection filter includes a second antireflection coating having a circular shape in front view and disposed in the first region and the second region, and the second wavelength selection coating has a circular shape in front view and is disposed on the second antireflection coating.

(14) In the projection lens unit according to (9), in the first wavelength selection coating of the wavelength selection filter, a spectral transmittance changes stepwise along a radial direction of the wavelength selection filter.

(15) In the projection lens unit according to (10), in the first and the second wavelength selection coatings of the wavelength selection filter, a spectral transmittance changes stepwise along a radial direction of the wavelength selection filter.

(16) In the projection lens unit according to (11), in the second wavelength selection coating of the wavelength selection filter, a spectral transmittance changes stepwise along a radial direction of the wavelength selection filter.

(17) In the projection lens unit according to any one of (1) to (16), the first light is light in a wavelength band between 430 nm and 500 nm inclusive, and the second light is light in a visible light band.

(18) In the projection lens unit according to (17), the second light is light in a wavelength band between 600 nm and 670 nm inclusive.

(19) In the projection lens unit according to any one of (1) to (18), the projection lens unit has a maximum angle of view more than or equal to 60 degrees.

(20) A projection display apparatus of the present disclosure includes the projection lens unit according to any one of (1) to (19), a light source unit that emits light, and the image forming unit that outputs the image light by using the light from the light source unit.

(21) A projection display apparatus of the present disclosure includes a light source unit that emits light, an image forming unit that outputs image light including first light and second light having a longer wavelength band than the first light by using the light from the light source unit, a projection lens unit that enlarges and projects the image light output from the image forming unit onto a projection target, and a wavelength selection filter disposed on an optical path between the image forming unit and the projection lens unit. The projection lens unit includes a plurality of lenses coated with a first antireflection coating. The wavelength selection filter has a first region in a center of the wavelength selection filter through which an optical axis passes and a second region around the first region, and a transmittance of the first light in the second region is lower than a transmittance of the first light in the first region.

(22) A projection display apparatus of the present disclosure includes a light source unit that emits light, an image forming unit that outputs image light including first light and second light having a longer wavelength band than the first light by using the light from the light source unit, a projection lens unit that enlarges and projects the image light output from the image forming unit onto a projection target, and a wavelength selection filter disposed on an optical path between the image forming unit and the projection lens unit. The projection lens unit includes a plurality of lenses coated with a first antireflection coating. The wavelength selection filter has a first region in a center of the wavelength selection filter through which an optical axis passes and a second region around the first region, and a transmittance of the second light in the first region is lower than a transmittance of the second light in the second region.

The present disclosure is applicable to a projection lens unit that enlarges and projects image light onto a projection target, and a projection display apparatus.

What is claimed is:

1. A projection lens unit that enlarges and projects image light output from an image forming unit onto a projection target, the image light including first light and second light having a longer wavelength band than the first light, the projection lens unit comprising:
a plurality of lenses coated with a first antireflection coating; and
a wavelength selection filter having a first region in a center of the wavelength selection filter through which an optical axis passes and a second region around the first region,
wherein in the wavelength selection filter, a transmittance of the first light in the second region is lower than a transmittance of the first light in the first region.

2. The projection lens unit according to claim 1, wherein in the wavelength selection filter, a transmittance of the second light in the first region is lower than a transmittance of the second light in the second region.

3. The projection lens unit according to claim 2, wherein the wavelength selection filter includes:
a first wavelength selection coating disposed in the second region and in which a transmittance of the first light is lower than a transmittance of the second light; and
a second wavelength selection coating disposed in the first region and in which a transmittance of the second light is lower than a transmittance of the first light.

4. The projection lens unit according to claim 3, wherein in the first and the second wavelength selection coatings of the wavelength selection filter, a spectral transmittance changes stepwise along a radial direction of the wavelength selection filter.

5. The projection lens unit according to claim 1, wherein the wavelength selection filter is disposed on a side of the image forming unit or on a side of the projection target of the projection lens unit.

6. The projection lens unit according to claim 1, wherein the wavelength selection filter is formed on an incident surface or an emission surface of a lens on a side of the image forming unit or on an incident surface or an emission surface of a lens on a side of the projection target in the projection lens unit.

7. The projection lens unit according to claim 1, wherein the wavelength selection filter has a spectral transmittance that changes rotationally symmetrically from an optical axis of the projection lens unit.

8. The projection lens unit according to claim 1, wherein in the wavelength selection filter, a difference between a transmittance of the first light in the first region and a transmittance of the first light in the second region ranges from 60% to 80% inclusive.

9. The projection lens unit according to claim 1, wherein the wavelength selection filter includes a first wavelength selection coating disposed in the second region and in which a transmittance of the first light is lower than a transmittance of the second light.

10. The projection lens unit according to claim 9, wherein the wavelength selection filter includes a second antireflection coating disposed in the first region and the second region and having a circular shape in front view, and
the first wavelength selection coating has an annular shape in front view, and is disposed on the second antireflection coating.

11. The projection lens unit according to claim 9, wherein in the first wavelength selection coating of the wavelength selection filter, a spectral transmittance changes stepwise along a radial direction of the wavelength selection filter.

12. The projection lens unit according to claim 1, wherein the first light is light in a wavelength band between 430 nm and 500 nm inclusive, and
the second light is light in a visible light band.

13. The projection lens unit according to claim 12, wherein the second light is light in a wavelength band between 600 nm and 670 nm inclusive.

14. The projection lens unit according to claim 1, wherein the projection lens unit has a maximum angle of view more than or equal to 60 degrees.

15. A projection display apparatus comprising:
the projection lens unit according to claim 1;
a light source unit that emits light; and
the image forming unit that outputs the image light by using the light from the light source unit.

16. A projection lens unit that enlarges and projects image light output from an image forming unit onto a projection target, the image light including first light and second light having a longer wavelength band than the first light, the projection lens unit comprising:
- a plurality of lenses coated with a first antireflection coating; and
- a wavelength selection filter having a first region in a center of the wavelength selection filter through which an optical axis passes and a second region around the first region,
- wherein in the wavelength selection filter, a transmittance of the second light in the first region is lower than a transmittance of the second light in the second region.

17. The projection lens unit according to claim 16, wherein the wavelength selection filter is disposed on a side of the image forming unit or on a side of the projection target of the projection lens unit.

18. The projection lens unit according to claim 16, wherein the wavelength selection filter is formed on an incident surface or an emission surface of a lens on a side of the image forming unit or on an incident surface or an emission surface of a lens on a side of the projection target in the projection lens unit.

19. The projection lens unit according to claim 16, wherein the wavelength selection filter has a spectral transmittance that changes rotationally symmetrically from an optical axis of the projection lens unit.

20. The projection lens unit according to claim 16, wherein in the wavelength selection filter, a difference between a transmittance of the second light in the first region and a transmittance of the second light in the second region ranges from 60% to 80% inclusive.

21. The projection lens unit according to claim 16, wherein the wavelength selection filter includes a second wavelength selection coating disposed in the first region and in which a transmittance of the second light is lower than a transmittance of the first light.

22. The projection lens unit according to claim 21, wherein
- the wavelength selection filter includes a second antireflection coating disposed in the first region and the second region and having a circular shape in front view, and
- the second wavelength selection coating has a circular shape in front view, and is disposed on the second antireflection coating.

23. The projection lens unit according to claim 21, wherein in the second wavelength selection coating of the wavelength selection filter, a spectral transmittance changes stepwise along a radial direction of the wavelength selection filter.

24. The projection lens unit according to claim 16, wherein
- the first light is light in a wavelength band between 430 nm and 500 nm inclusive, and
- the second light is light in a visible light band.

25. The projection lens unit according to claim 24, wherein the second light is light in a wavelength band between 600 nm and 670 nm inclusive.

26. The projection lens unit according to claim 16, wherein the projection lens unit has a maximum angle of view more than or equal to 60 degrees.

27. A projection display apparatus comprising:
- the projection lens unit according to claim 16;
- a light source unit that emits light; and
- the image forming unit that outputs the image light by using the light from the light source unit.

28. A projection display apparatus comprising:
- a light source unit that emits light;
- an image forming unit that outputs image light including first light and second light having a longer wavelength band than the first light by using the light from the light source unit;
- a projection lens unit that enlarges and projects the image light output from the image forming unit onto a projection target; and
- a wavelength selection filter disposed on an optical path between the image forming unit and the projection lens unit,
- wherein the projection lens unit includes a plurality of lenses coated with a first antireflection coating, and
- the wavelength selection filter has a first region in a center of the wavelength selection filter through which an optical axis passes and a second region around the first region, and a transmittance of the first light in the second region is lower than a transmittance of the first light in the first region.

29. A projection display apparatus comprising:
- a light source unit that emits light;
- an image forming unit that outputs image light including first light and second light having a longer wavelength band than the first light by using the light from the light source unit;
- a projection lens unit that enlarges and projects the image light output from the image forming unit onto a projection target; and
- a wavelength selection filter disposed on an optical path between the image forming unit and the projection lens unit,
- wherein the projection lens unit includes a plurality of lenses coated with a first antireflection coating, and
- the wavelength selection filter has a first region in a center of the wavelength selection filter through which an optical axis passes and a second region around the first region, and a transmittance of the second light in the first region is lower than a transmittance of the second light in the second region.

* * * * *